United States Patent [19]

Mas et al.

[11] Patent Number: 4,965,147
[45] Date of Patent: Oct. 23, 1990

[54] SEPARATOR FOR AN ELECTROCHEMICAL CELL OF THE METAL-AIR TYPE AND HAVING AN ALKALINE ELECTROLYTE

[75] Inventors: Jean-Claude Mas; André Mendiboure, both of Levallois Perret, France

[73] Assignee: Societe Anonyme dite: CIPEL, Levallois Perre, France

[21] Appl. No.: 380,404

[22] Filed: Jul. 17, 1989

[30] Foreign Application Priority Data

Jul. 25, 1988 [FR] France ................... 88 10018

[51] Int. Cl.$^5$ .................................... H01M 2/16
[52] U.S. Cl. ................................. 429/136; 429/145; 429/252; 429/254
[58] Field of Search .............. 429/136, 144, 145, 251, 429/252, 254, 142; 427/335, 375, 384

[56] References Cited

U.S. PATENT DOCUMENTS 3,892,591 7/1975 Uetani et al. .................... 429/201
4,361,632 11/1982 Weber et al. .................... 429/145

OTHER PUBLICATIONS

182075y, Separator Layer for Paper-Lined Dry Batteries 6001, Chemical Abstracts, vol. 83, No. 22, Dec. 1, 1975.

Primary Examiner—Anthony Skapars
Attorney, Agent, or Firm—Sughrue, Mion, Zinn, Macpeak & Seas

[57] ABSTRACT

A separator for an electrochemical primary cell of the metal-air type and having an alkaline electrolyte comprises a support based on woven or non-woven fibers, with at least one of the faces of the support being provided with a film of polyvinyl alcohol is insoluble in the alkaline medium.

7 Claims, 1 Drawing Sheet

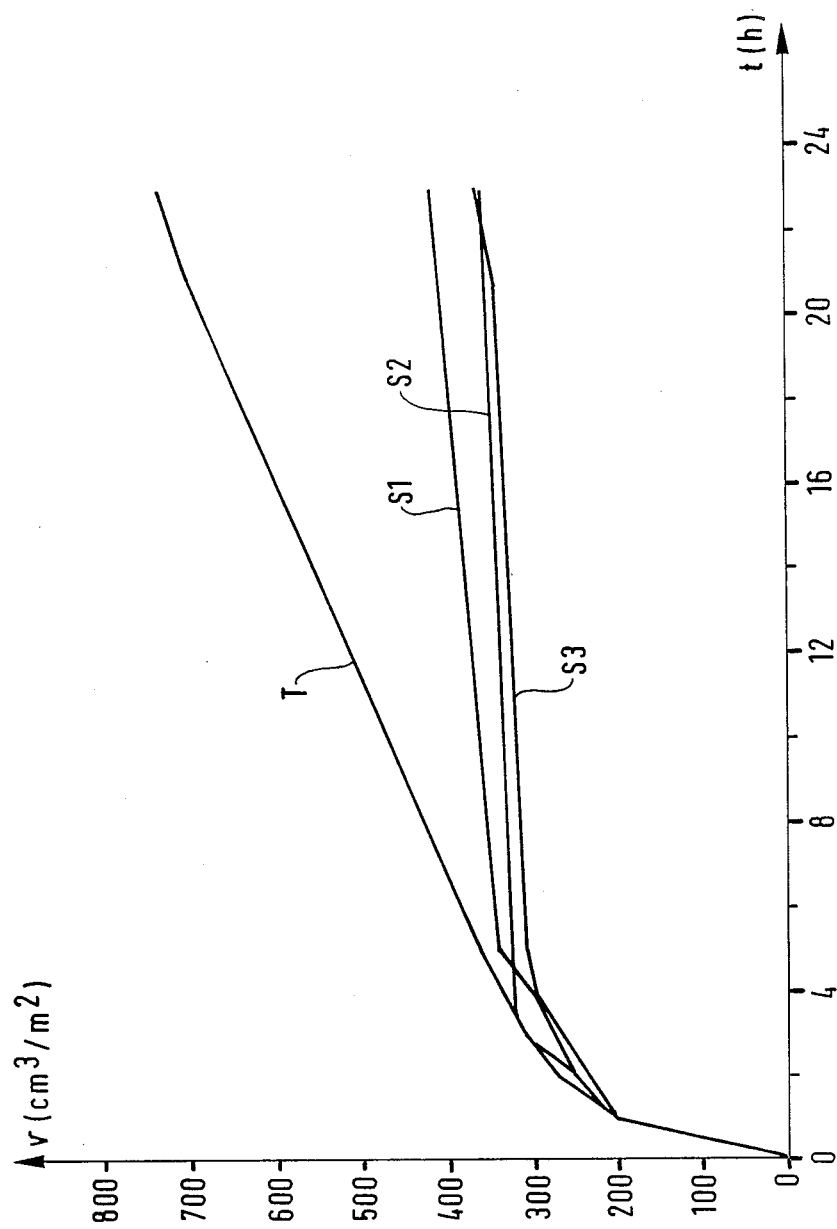

SEPARATOR FOR AN ELECTROCHEMICAL CELL OF THE METAL-AIR TYPE AND HAVING AN ALKALINE ELECTROLYTE

The present invention relates to a separator for a metal-air type electrochemical cell having an alkaline electrolyte, the cell including, inter alia, a porous positive electrode based on a metal oxide and regenerable by oxygen diffusing through the pores of the electrode.

BACKGROUND OF THE INVENTION

In general, the separators used in batteries (whether rechargeable or not) need to have the following properties:

high electrical resistivity in order to avoid short circuit currents flowing between the electrodes;

sufficient porosity to allow ions to pass between the cathode and the anode compartments;

high mechanical strength in order to withstand handling stresses during manufacture, and the stresses due to changes in electrode volume during charging and discharging processes;

the ability to withstand chemical attack by the highly concentrated alkaline electrolyte, by impurities, and by the electrode materials; and low cost and ease of manufacture.

The separators conventionally used in alkaline and in saline primary cells or "batteries" are constituted by woven or non-woven, vinyl, cellulose, or olefin fibers. Their qualities then result from an appropriate adjustment between porosity, mechanical strength, wettability by liquids, and thickness.

The porosity of a separator is adjusted to prevent particles from either electrode going through the separator and reacting with the other electrode which would give rise to self-discharge possibly accompanied by the evolution of gas inside the cell. One way of achieving this result is to increase thickness or to increase the number of layers in the separator, however this entrains the drawback of reducing the volume available for the anode and the cathode materials.

In addition, specific problems arise for each type of electrochemical cell.

Thus, in rechargeable cells including a negative electrode based on zinc and an alkaline electrolyte based on concentrated sodium or potassium hydroxide, it is well known that the electrochemical cycling of the zinc electrode in successive charges and discharges gives rise to major drawbacks. Thus, there is the problem of the zinc electrode changing shape due to preferential redeposition of zinc on the central or bottom face of the current collector. This phenomenon increases the thickness of the electrode at certain points and gives rise to higher and higher current densities, thereby reducing the efficiency of the zinc at charging electricity. In addition, mechanical stresses due to the increasing thickness and to the change in shape of the electrode are generally fatal for the lifetime of a storage cell.

A second problem that arises with such storage cells during charging is the appearance and growth of zinc dendrites on the surface of the electrode. During successive cycles, dendrite growth can continue until the space between the zinc negative electrode and the positive electrode is bridged, thereby setting up an internal short circuit. One known way of avoiding this problem is to use separators characterized by good mechanical resistance to thrust from dendrites or by low permeability to diffusion of zincate ions, so as to limit concentration gradients in the electrolyte, since such gradients encourage the dendrite growth.

For metal-air type primary cells, having some or all of the positive electrode constituted by a porous compacted mass based on a metal oxide such as manganese dioxide ($MnO_2$), and regenerable by oxygen flowing through the pores of the electrode, another major problem occurs which is totally different from that which arises in zinc electrode storage batteries.

With a positive electrode constituted by a mass which is porous to air, there exists some flow of oxygen within the electrode right up to the immediate vicinity of the separator. More precisely, oxygen in the air penetrates into the cell via the pores of the positive electrode and is then reduced to water at active sites (catalysts) on the air electrode if present or on the manganese dioxide of the positive active mass. However, some of the oxygen may avoid reaction and diffuse through the separator towards the negative electrode. The material from which the negative electrode is constituted then oxidizes chemically. This self-discharge mechanism reduces the capacity of the electrochemical cell. Such self-discharge is particularly problematic under conditions of intermittent utilization where the service life of the cell may be several months.

Similarly, during storage, if the cell is not protected by gas-tight packaging, then the metal constituting the negative electrode will oxidize and give rise to a major loss in capacity.

For example, a zinc based anode gel as currently used in alkaline batteries may loose between 20% to 80% of its capacity over a period of one year.

Several patents describe separators which use polyvinyl alcohol and which have the property of limiting the diffusion of ions in the electrolyte (in particular zincates) in order to avoid zinc dendrite growth or perforation of the separator in silver-zinc, nickel-zinc, or air-zinc rechargeable storage cells.

However, these separators give poor results in metal-air type primary cells. They are characterized by major cross-linking of the polyvinyl alcohol in order to ensure good mechanical strength for resisting piercing by dendrites, and in order to establish a lattice of macromolecular chains constituting a barrier to the passage of zincate ions in solution in the electrolyte.

This high degree of cross-linking reduces the hydrophilic properties of the separator and consequently reduces its ability to absorb highly concentrated alkaline electrolyte.

Another drawback of such separators is their relatively high electrolytic resistance which limits the power that the cell can deliver in high power consumer market applications (radios, flash guns, tape recorders, etc.).

U.S. Pat. No. 4,361,632 describes a composite separator in which cross-linking is performed hot, enabling ion diffusion to be limited, and in particular limiting the diffusion of zincates in rechargeable zinc electrode storage batteries.

French patent No. FR-A-2 251 922 describes a separator having a plurality of layers comprising a porous layer and a semipermeable membrane constituted by a derivative of polyvinyl alcohol. The method described seeks to avoid having the porous layer embedded at depth, and to limit impregnation in a surface zone of the porous layer. The resulting highly cross-linked PVA film is doubtless effective at limiting the diffusion of zincates in storage batteries having rechargeable zinc electrodes, but it does not limit the diffusion of very small molecules such as molecules of oxygen in gaseous form or dissolved in the electrolyte.

French patent No. FR-A-2 110 486 describes an alkaline storage battery including a sheet of highly cross-linked polyvinyl alcohol surrounding the zinc electrode and retaining the zincates.

U.S. Pat. No. 3,892,592 and Japanese patent No. JP-A-7 567 428 describe the use of polyvinyl alcohol in C/Zn saline batteries, as a separator paste with a saline electrolyte and a support made of paper in order to ensure good reactivity for the solid zinc electrode in the form of a container.

The object of the present invention is to solve problems specific to primary metal/air type alkaline electrochemical cells, and to find a separator which is satisfactory for use in such cells.

SUMMARY OF THE INVENTION

The present invention provides a separator for an electrochemical primary cell of the metal-air type and having an alkaline electrolyte, the cell including, in particular, a zinc based negative electrode and said separator which includes a support based on woven or non-woven fibers, wherein the support is provided with at least one film based on polyvinyl alcohol which has very low permeability to the diffusion of dissolved oxygen, said polyvinyl alcohol being moderately cross-linked, said separator absorbing between 150 grams per square meter ($g.m^{-2}$) and 300 $g.m^{-2}$ of 8.5N potassium hydroxide solution, said electrolyte being imprisoned in the polyvinyl alcohol lattice without the possibility of hydrodynamic exchange with the cell, said separator having an electrolytic resistance lying in the range 0 milliohms per square centimeter ($m\Omega.cm^{-2}$) and 2 $m\Omega.cm^{-2}$, and a thickness of less than 0.2 mm.

The thickness of said film may lie, for example, in the range 25 microns to 60 microns.

The thickness of said separator may lie, for example, in the range 100 microns to 200 microns, and is preferably about 150 microns.

In a first variant, said support is non-woven and based on organic or inorganic fibers selected from: polyamide; polyethylene; cellulose; polyester; polypropylene; and glass.

In a second variant, said support is woven and based on organic or inorganic fibers selected from: polyamide; polyethylene; cellulose; polyester; polypropylene; and glass.

The separator of the invention thus has a very low speed of oxygen diffusion through its thickness and is suitable for strongly absorbing a highly concentrated alkaline solution.

In the cell, a certain quantity of alkaline electrolyte is absorbed in the structure of the separator, said absorbed electrolyte then being highly immobilized without any possibility of hydrodynamic exchange with the other portion of the cell.

The separator has low electrolytic resistance which is particularly suitable for high current primary batteries for consumer applications.

Another remarkable property is the excellent mechanical strength for withstanding stresses due to changes in electrode volume.

The present invention also provides a method of manufacturing a separator of the invention.

In a first method, the film of polyvinyl alcohol is obtained by spreading a coat of an aqueous solution of polyvinyl alcohol over at least a portion of the support, and then eliminating the solvent.

In a second method, a highly hydrolyzed commercially available film of polyvinyl alcohol is heat fused over a part or all of the surface.

The film of polyvinyl alcohol is spread or heat fused over one or both faces, optionally in a plurality of successive layers.

BRIEF DESCRIPTION OF THE DRAWING

Embodiments of the invention are described below by way of non-limiting example. The sole FIGURE in the accompanying drawing is a graph in which the curves illustrate the oxygen permeability of a prior art separator and of separators of the invention.

DETAILED DESCRIPTION

In a first method, a mixture is prepared and then spread or pasted onto a support. The mixture has the following composition (by weight):
deionized water 80% to 90%;
polyvinyl alcohol 10% to 20%;  (1)
conservation agent 0% to 5%.

Vigorous stirring is maintained during dissolution. The solution is then heated to a temperature lying in the range 80° C. to 100° C. with stirring. A cross-linking agent or organic or inorganic origin may optionally be added. After being stored for 24 hours, the viscosity of such a solution at 25° C. lies in the range 50 centipoises to 100 centipoises.

The resulting viscous solution is then spread or pasted onto a woven or non-woven support. The spreading on the support may be performed by running along a guide rail. A scraper disposed above the support is fed with solution. The rate at which solution is fed to the scraper is a function of its angle and its speed relative to the support. Depending on the desired results, the support may have solution spread on one or both faces, optionally as a plurality of successive layers.

The composition, the viscosity, and the spreading speed are adjusted in order to impregnate the woven or non-woven support in depth, in other words in order to absorb between 150 grams per square meter ($g/m^2$) and 300 $g/m^2$ of electrolyte (8.5 N solution of KOH), thereby obtaining an electrolytic resistance lying in the range 0 milliohms/$cm^2$ ($m\Omega/cm^2$) to 2 $m\Omega/cm^2$, and to obtain oxygen permeability of less than 17 $cm^3.m^{-2}.h^{-1}$ as determined by an experimental set-up described below, with a total thickness of less than 0.2 mm.

It is important to obtain a separator whose characteristics as mentioned above are uniformly identical at all points on the surface of the separator.

In particular, it is important to avoid having the largest pores poorly covered or covered with insufficient thickness of polyvinyl alcohol. The resulting separator is then dried at a temperature which is selected to avoid excessive cross-linking. Drying is preferably performed at ambient temperature.

By way of example, a non-woven support as used conventionally in alkaline batteries had the above mixture spread thereon.

The characteristics of the support were as follows:
weight 39 $g/m^2$
thickness 100 microns
electrolytic resistance 1 $m\Omega/cm^2$.

After spreading on the paste at a rate of 10 meters per minute (m/mn) on one face, a separator was obtained having the following characteristics:
weight 70 g/m$^2$
thickness 150 microns
electrolytic resistance 1.5 mΩ/cm$^2$
electrolytic absorption 180 g.m$^{-2}$
oxygen permeability 15 cm$^3$.cm$^{-2}$.h$^{-1}$ When the paste was spread on both faces of the support, the characteristics were:
weight 90 g/m$^2$
thickness 200 microns
electrolytic resistance 3.5 mΩ/cm$^2$
electrolytic absorption 140 g.m$^{-2}$
oxygen permeability 20 cm$^3$.cm$^{-2}$.h$^{-1}$ A separator coated on one face only has half the resistance of a separator coated on both faces. Too high a resistance in a separator is a drawback in electrochemical cells since it reduces the average voltage level and consequently represents a loss of power.

It can be seen in this example that the technique of manufacturing said pasted separator enable a well-covered support to be obtained while keeping the electrolytic resistance of the separator within acceptable limits.

It is even observed that oxygen permeability falls off with increasing electrolytic absorption.

Thus, the separators based on polyvinyl alcohol as commonly used in storage batteries having zinc electrodes and characterized by a high degree of cross-linking are much less effective than a separator of the invention by virtue of their poor electrolytic absorption. The barrier effect due to the lattice of cross-linked macromolecular chains is not effective against oxygen molecules dissolved in the electrolyte.

In contrast, the effectiveness of the separator of the invention may be explained by the effect of the alkaline electrolyte being imprisoned in the polyvinyl alcohol lattice. It may be assumed that the very low solubility and the very low speed of diffusion of oxygen in concentrated potassium hydroxide, and also that the absence of hydrodynamic exchange between the electrolyte absorbed on the separator and the free electrolyte in the cell give rise to a very significant barrier effect against the passage of oxygen in solution through the separator.

In a second method making use of hot rolling, a multilayer separator is made by applying an insoluble screen film of polyvinyl alcohol onto a woven or non-woven support by heat fusion. The film of polyvinyl alcohol must be insoluble in the alkaline medium and may be constituted, for example, by a polyvinyl alcohol film sold by the firm NEDI.

Its weight is 31 g/m$^2$, its thickness lies in the range 25 microns to 60 microns, and its electrolytic resistance is 0.5 mΩ/cm$^2$. Heat fusion may be performed continuously by passing the support and the polyvinyl alcohol film between two heating rollers. The quality of the adhesion depends on the pressure exerted, on the contact time, and on the temperature of the rollers. For example, a pressure may be used lying in the range 1.5 kg/cm$^2$ to 5 kg/cm$^2$ and a temperature in the range 60° C. to 80° C., and preferably 80° C.

The characteristics of the separator obtained in this way were as follows:

| | |
|---|---|
| film of polyvinyl alcohol (NEDI): | 30 microns thick |
| non-woven support: | 100 microns thick |
| separator S$_2$ with heat fused layers: | 130 microns thick |
| electrolytic resistance: | 1.5 mΩ/cm$_2$ |
| electrolytic absorption: | 150 g · m$^{-2}$ |
| oxygen permeability: | 13 cm$^3$ · cm$^{-2}$ · h$^{-1}$ |

Using this method of manufacture, it is possible to obtain low thickness and low electrolytic resistance while retaining very low oxygen permeability. Another advantage of this variant is that the non-woven side of the resulting separator retains its electrolyte absorption properties, thereby improving ion conductivity between the anode and cathode surfaces. This method is thus particularly advantageous for use in a primary cell.

Other known methods of gluing a film on a support give rise, because of the glue, to electrolytic resistances which are 50% to 100% greater than the above values.

Various tests performed on the separators obtained as described above are now described.

Tests were performed on the following separators:

A reference separator T as conventionally used in primary electrochemical cells, constituted by a non-woven felt of fibers;

A separator S$_1$ in accordance with the invention constituted by a reference separator coated on both faces with the polyvinyl alcohol solution having the above-described composition (1); and A separator S$_2$ in accordance with the invention constituted by a reference separator hot rolled with a film of polyvinyl alcohol.

The separators of the invention were tested in alkaline batteries of the zinc/manganese dioxide type in order to evaluate the influence of these separators with respect to voltage level and capacity.

The reference cell was an LR6 size (CEI standard) alkaline battery having a non-woven fibrous separator. Cell P$_1$ is a similar battery except that its separator S$_3$ coated on one face with a polyvinyl alcohol solution of the invention.

Cell P$_2$ was a similar battery except that its separator was hot rolled with a polyvinyl alcohol film of the invention (separator S$_2$).

Table I gives results for two discharge regimes (emf in volts; U/5Ω=instantaneous voltage test with the battery connected across a resistance of 5 ohms; discharge duration measured in hours, up to a stop voltage of 0.9 volts).

TABLE I

| RECORDER RATE. | DISCHARGE THROUGH 10 OHMS. | | 1 HOUR PER DAY. | |
|---|---|---|---|---|
| | emf (Volts) | U/5Ω (Volts) | Time to Stop U (Hours) | Yield % |
| Reference | 1.57 | 1.52 | 15.66 | 68% |
| P$_1$ | 1.58 | 1.53 | 15.75 | 69% |
| P$_2$ | 1.57 | 1.53 | 15.87 | 71% |

| RADIO RATE. | DISCHARGE THROUGH 75 OHMS. | | 4 HOURS PER DAY. | |
|---|---|---|---|---|
| | emf (Volts) | U/5Ω (Volts) | Time to Stop U (Hours) | Yield % |
| Reference | 1.58 | 1.53 | 134.42 | 87.1 |
| P$_1$ | 1.58 | 1.52 | 137.23 | 88.5 |
| P$_2$ | 1.57 | 1.52 | 140.00 | 87.2 |

It can be seen that the separators investigated do not affect performance, and in particular the measured values in Table I are identical.

The oxygen permeability of said separators was measured using an experimental set-up described below. The separator under test is placed between two compartments A and B of an air-tight vessel. An oxygen inlet and an oxygen outlet are provided in compartment A. In order to get as close as possible to utilization conditions of metal-air type cells, the gas pressure in compartment A is adjusted to one bar. The oxygen of flow rate is adjusted to 4 liters per hour. Compartment B has an outlet to a gas recovery chamber which is initially filled with nitrogen. At regular intervals, a sample of gas is taken from the gas recovery chamber and its oxygen content is analyzed. This content is a measure of the speed at which oxygen diffuses through the separator between compartments A and B.

Several types of separator were tested:

A reference separator T as mentioned above and as commonly used in alkaline batteries;

Above-mentioned separator $S_3$: a reference separator coated on one face with the a solution of polyvinyl alcohol;

An above-mentioned separator $S_1$: a reference separator coated on both faces with a solution of polyvinyl alcohol; and An above-mentioned separator $S_2$: a reference separator having a polyvinyl alcohol film as sold by the firm NEDI hot rolled thereon.

All of the separators were tested after being impregnated with 8.5N potassium hydroxide which constitutes the electrolyte in alkaline cells.

The results are shown in FIG. 1 by corresponding curves referenced T, $S_1$, $S_2$, and $S_3$ illustrating the quantity of diffused oxygen v ($cm^3/m^2$) as a function of time t (in hours). A very large difference in permeability between the reference separator and separators of the invention can be seen. Thus, after 24 hours, the quantity of oxygen that diffuses through the reference separator is approximately twice that which is observed to diffuse through the separator $S_1$, $S_2$, and $S_3$. In addition, the rate of oxygen diffusion stabilizes quickly in separators of the invention, whereas it continues to increase with the reference separator.

It is thus observed that using separator made in accordance with the present invention in electrochemical cells, and in particular metal-air type cells, makes it possible to limit the corrosion of the zinc constituting the negative electrode very considerably. This advantage is obtained without reducing the electrical performance of the cell since the method of manufacture described above makes it possible to obtain separators of low thickness, low electrolytic resistance, good wettability by the electrolyte, and good mechanical strength.

A particularly advantageous configuration is to wrap the zinc negative electrode in a separator made up as a bag for the purpose of preventing oxygen diffusion. Naturally other forms of wrapping the negative electrode could be used and come within the competence of the person skilled in the art.

In addition, in particular for limiting the extra cost of this type of separator, it is possible to cover only a portion of the fibrous support by spreading or heat fusion. The area to be covered is selected so as to provide effective protection for the volume of the negative electrode.

We claim:

1. An improved composite separator, for use in an electrochemical primary cell of the metal-air type having an alkaline electrolyte, including a support constituted by woven or non-woven fibers and at least one film of moderately cross-linked polyvinyl alcohol forming a lattice, the improvement consisting in selecting the structure and materials of said composite separator so that: said film has a very low permeability to the diffusion of dissolved oxygen; said separator absorbs between 150 $g.m^{-2}$ and 300 $g.m^{-2}$ of 8.5N potassium hydroxide electrolyte solution, said solution being imprisoned in the polyvinyl alcohol lattice without the possibility of hydrodynamic exchange with the rest of said cell; and said separator has an electrolytic resistance in the range of 0 $m\Omega.cm^{-2}$ and 2 $m\Omega.cm^{-2}$, and a thickness of less than 0.2 mm.

2. A separator according to claim 1, wherein the thickness of said film lies in the range 25 microns to 60 microns.

3. A separator according to claim 1, having a thickness lying in the range 100 microns to 200 microns.

4. A separator according to claim 3, having a thickness of about 150 microns.

5. A separator according to claim 1, wherein said support is constituted by non-woven fibers selected from the group consisting of: polyamide; polyethylene; cellulose; polyester; polypropylene; and glass.

6. A separator according to claim 1, wherein said support is constituted by woven fibers selected from the group consisting of: polyamide; polyethylene; cellulose; polyester; polypropylene; and glass.

7. A separator according to claim 1, constituted by an envelope corresponding to the shape of the electrode to which it is to be associated.

* * * * *